United States Patent
Hara

(10) Patent No.: US 9,363,615 B2
(45) Date of Patent: Jun. 7, 2016

(54) DELAY MEASUREMENT APPARATUS AND DELAY MEASUREMENT METHOD FOR NETWORK MUSIC SESSION

(71) Applicant: Yamaha Corporation, Hamamatsu-shi, Shizuoka-ken (JP)

(72) Inventor: Takahiro Hara, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 254 days.

(21) Appl. No.: 14/091,231

(22) Filed: Nov. 26, 2013

(65) Prior Publication Data

US 2014/0153728 A1    Jun. 5, 2014

(30) Foreign Application Priority Data

Nov. 30, 2012  (JP) .................................. 2012-263880

(51) Int. Cl.
*H04R 29/00* (2006.01)
*H04L 12/26* (2006.01)

(52) U.S. Cl.
CPC ............ *H04R 29/00* (2013.01); *H04L 43/0852* (2013.01)

(58) Field of Classification Search
CPC ............................ H04R 29/00; H04L 43/0852
USPC ........................................................... 381/58
See application file for complete search history.

(56) References Cited

U.S. PATENT DOCUMENTS

2010/0235486 A1* 9/2010 White ................. H04L 43/0858
709/223

FOREIGN PATENT DOCUMENTS

| EP | 2 432 160 A1 | 3/2012 |
| JP | 2005-195982 A | 7/2005 |
| WO | WO-2008/138047 A1 | 11/2008 |

OTHER PUBLICATIONS

Anonymous. (Sep. 17, 2012). "Latency (audio), Wikipedia, the free encyclopedia," Wikipedia, retrieved from internet: <URL:http://en.wikipedia.org/w/index.php?title=Latency_%28audio%29&oldid=513048750>, retrieved on Feb. 19, 2014, the whole document, four pages.

(Continued)

*Primary Examiner* — Paul S Kim
(74) *Attorney, Agent, or Firm* — Morrison & Foerster LLP

(57) ABSTRACT

In this system, a terminal A retrieves terminal's input delay time Tia from input of an audio signal to start of transmission of the audio signal, transmission delay time Tn from the start of transmission of the audio signal to reception of the audio signal by a partner terminal B, partner's reception buffering delay time Tbfb from reception of the audio signal to output of the audio signal by a reception buffer portion BFb of the partner terminal B, and partner's output delay time Tob from input of the audio signal to output of the audio signal by an audio reproduction portion DRob of the partner terminal B. The terminal A then sums up these delay times to determine input/output delay time Ttab from the input of the audio signal by the terminal A to the output of the audio signal by the audio reproduction portion DRob of the partner terminal B.

11 Claims, 4 Drawing Sheets

(56) References Cited

OTHER PUBLICATIONS

Extended European Search Report dated Mar. 4, 2014, for EP Application No. 13194423.3, nine pages.
Lazzaro, J. et al. (Jun. 25, 2001). "A Case for Network Musical Performance," Proceedings of the 11th International Workshop on Network and Operating Systems Support for Digital Audio and Video, NOSSDAV 2001, Port Jefferson, NY, pp. 157-166.
Yensen, T. et al. (Dec. 7, 1998). "Determining Acoustic Round Trip Delay for VOIP Conferences," Multimedia signal processing, 1998 IEEE, second workshop on Redondo Beach, CA, Piscataway, NJ, USA, IEEE, US, pp. 161-166, the whole document, six pages.

* cited by examiner

DELAY MEASUREMENT APPARATUS AND DELAY MEASUREMENT METHOD FOR NETWORK MUSIC SESSION

BACKGROUND OF THE INVENTION

1. Field of the Invention

The present invention relates to a delay measurement system for network music session in which a musical session such as musical performance is performed between a plurality of electronic musical terminals connected through a communication network such as the Internet.

2. Description of the Related Art

Conventionally, there are known network music sessions that enable musical sessions such as ensemble performance of musical instruments and chorus such as duet through a communication network such as Internet. In an ensemble system disclosed in Japanese Unexamined Patent Publication No. 2005-195982, for example, performance information based on musical performance played on one terminal is transmitted to a partner terminal, and also supplies the performance information to a musical tone generation portion of the one terminal after a predetermined period of delay time in order to allow both the terminals to emit musical tones based on the musical performance played on the one terminal in synchronization between the terminals.

The delay time ($\Delta T$) for which generation of musical tones is delayed on the one terminal is determined by a scheme in which network round trip time RTT (Round Trip Time) is measured to figure out one-way network delay time ($\Delta t\ net$) on the basis of a value ($T0$) of the measured round trip time RTT (paragraph [0029] of the above-described Japanese Unexamined Patent Publication). In general, furthermore, network delay time between two terminals can be figured out by synchronizing clocks of the terminals to send a packet with a time-stamp indicative of recording time from one terminal so that the other terminal can figure out a difference between the current time and the time indicated by the time-stamp when the other terminal reproduces the packet.

In order to realize a network music session, furthermore, there is a user's request asking to know the delay time taken to deliver a musical tone generated by the user's terminal to the other terminal or the delay time taken to deliver a musical tone generated by the other terminal to the user. In network music sessions, more specifically, the amount of delay varies depending on network environment and physical distances. However, a delay of a certain amount of time or more can hinder network music sessions. Therefore, users of the network music session desire to know the delay time to determine whether they can perform the session or not. Generally speaking, network music session cannot be established with a delay of about 40 milliseconds or more. With a delay of about 30 milliseconds, however, an ensemble can be completely synchronized with partner players by timing slightly fast. The delay time can be used to determine whether the users should make such an effort or not.

However, the scheme in which the network delay time is figured out by measuring the RTT does not include delays other than the network. Therefore, the scheme fails to figure out accurate delay time from input of a musical tone on one terminal to output of the musical tone on the other terminal. Furthermore, because the above-described scheme in which a difference between the time-stamp indicative of the time at which a musical tone is input, and the time at which the musical tone is output is figured out is predicated on high precision clock synchronization between the terminals, such a scheme cannot be applied to a communication system such as the Internet having low reliability due to inconstant delays.

SUMMARY OF THE INVENTION

The present invention was accomplished to solve the above-described problems, and an object thereof is to provide a delay measurement system which can accurately measure input/output delay time taken from input of an audio signal on one terminal to output of the audio signal on its partner terminal in a music session through a communication network such as the Internet. As for the following descriptions about respective constituent features of the present invention, furthermore, reference letters of corresponding components of an embodiment described later are provided in parentheses to facilitate the understanding of the present invention. More specifically, the reference letters correspond to the components of the embodiment, based on a case where a session terminal is a "session terminal A" of the embodiment, with a partner session terminal being a "session terminal B" of the embodiment. However, it should not be understood that the constituent features of the present invention are limited to the corresponding components indicated by the reference letters of the embodiment.

It is a feature of the present invention to provide a delay measurement apparatus for network music session, the delay measurement apparatus being provided on a session terminal (TMa) that performs a network music session with a partner session terminal (TMb) connected with the session terminal through a communication network so that the session terminal communicates with the partner session terminal, the delay measurement apparatus including: a terminal's input delay retrieval portion (A1)) for retrieving terminal's input delay time (Tia) from input of an audio signal to start of transmission of the audio signal on the terminal; a transmission delay retrieval portion (A4) for retrieving transmission delay time (Tn) from the terminal to the partner terminal (TMb), the transmission delay time being taken from the start of transmission of the audio signal by the session terminal to reception of the audio signal by the partner session terminal; a partner's reception buffering delay retrieval portion (A3) for retrieving partner's reception buffering delay time (Tbfb) from reception of the audio signal by a reception buffer portion (BFb) of the partner session terminal (TMb) to input of the audio signal to an audio reproduction portion (DRob) of the partner session terminal; a partner's output delay retrieval portion (A2) for retrieving partner's output delay time (Tob) from input of the audio signal from the reception buffer portion (BFb) to output of the audio signal by the audio reproduction portion (DRob) on the partner session terminal (TMb); and an input/output delay time determination portion (A5) for summing up the terminal's input delay time (Tia) retrieved by the terminal's input delay retrieval portion (A1), the transmission delay time (Tn) from the terminal to the partner terminal retrieved by the transmission delay retrieval portion (A4), the partner's reception buffering delay time (Tbfb) retrieved by the partner's reception buffering delay retrieval portion (A3), and the partner's output delay time (Tob) retrieved by the partner's output delay retrieval portion (A2), and determining input/output delay time (Ttab) from the input of the audio signal on the terminal to the output of the audio signal from the audio reproduction portion (DRob) of the partner session terminal (TMb).

According to the present invention configured as above, on the session terminal (TMa) which performs a network music session with the partner session terminal (TMb) connected with the session terminal (TMa) through a communication network (CN) so that the session terminal (TMa) communicates with the partner session terminal (TMb), the terminal's input delay time (Tia) from input of an audio signal to start of transmission of the audio signal is obtained. On the partner session terminal (TMb), the partner's output delay time (Tob) from input of the audio signal from the reception buffer portion (BFb) to output of the audio signal by the audio reproduction portion (DRob) is obtained. On the partner session terminal (TMb), furthermore, the partner's reception buffering delay time (Tbfb) from reception of the audio signal by the reception buffer portion (BFb) to input of the audio signal to the audio reproduction portion (DRob) is obtained. In addition, the transmission delay time (Tn) from the start of transmission of the audio signal by the session terminal to reception of the audio signal by the partner session terminal (TMb) is obtained. The obtained terminal's input delay time (Tia), the partner's output delay time (Tob), the partner's reception buffering delay time (Tbfb) and the transmission delay time from the terminal to the partner terminal (Tn) are summed up to determine the input/output delay time (Tab) from the input of the audio signal by the terminal to the output of the audio signal by the audio reproduction portion (DRob) of the partner terminal (TMb). According to the present invention, therefore, by using the delay information (Tob, DRob) of the partner terminal (TMb) which performs a network music session, the terminal (TMa) can precisely figure out the input/output delay time (Tab) from the input of the audio signal by the terminal (TMa) to the output of the audio signal by the partner terminal (TMb).

It is another feature of the present invention that the transmission delay retrieval portion (A4) retrieves updated transmission delay time (Tn) from the terminal to the partner terminal (TMb) by using measurement packets which are transmitted and received at regular intervals between the partner session terminal to monitor time at which the measurement packets are transmitted and received. This feature allows retrieval of precise transmission delay time (Tn) from the terminal to the partner terminal necessary for the measurement of the input/output delay time (Tab) from the terminal to the partner terminal without high-precision clock synchronization between the terminal and the partner terminal.

It is still another feature of the present invention that a buffer size of the reception buffer portion (BFb) of the partner session terminal (TMb) is changed automatically or is changed in accordance with user's manipulation; and the partner's reception buffering delay retrieval portion (A3) retrieves updated partner's reception buffering delay time (Tbfb) regularly calculated in accordance with the buffer size from the partner session terminal (TMb). This feature allows retrieval of precise partner's reception buffering delay time (Tbfb) necessary for the measurement of the input/output delay time (Tab) from the terminal to the partner terminal.

In the present invention, furthermore, the terminal's input delay time (Tia) includes delay time caused by A/D conversion and encoding of the input audio signal by an audio output portion. It is a further feature of the present invention that the partner's output delay time (Tob) includes delay time caused by decoding and D/A conversion of the input audio signal by the audio reproduction portion (DRob) of the partner session terminal (TMb); and the partner's output delay retrieval portion (A2) retrieves the partner's output delay time (Tob) from the partner session terminal (TMb) in response to establishment of connection with the partner session terminal (TMb). This feature allows retrieval of precise terminal's input delay time (Tia) and partner's output delay time (Tob) necessary for the measurement of the input/output delay time (Tab) from the terminal to the partner terminal.

The embodiment of the present invention is not limited to the delay measurement apparatus for network music session, but can be a delay measurement method, a delay measurement computer program for network music session and a computer-readable medium storing the compute program.

DESCRIPTION OF THE PREFERRED EMBODIMENT

[Overview of System Configuration]

Figure 1:
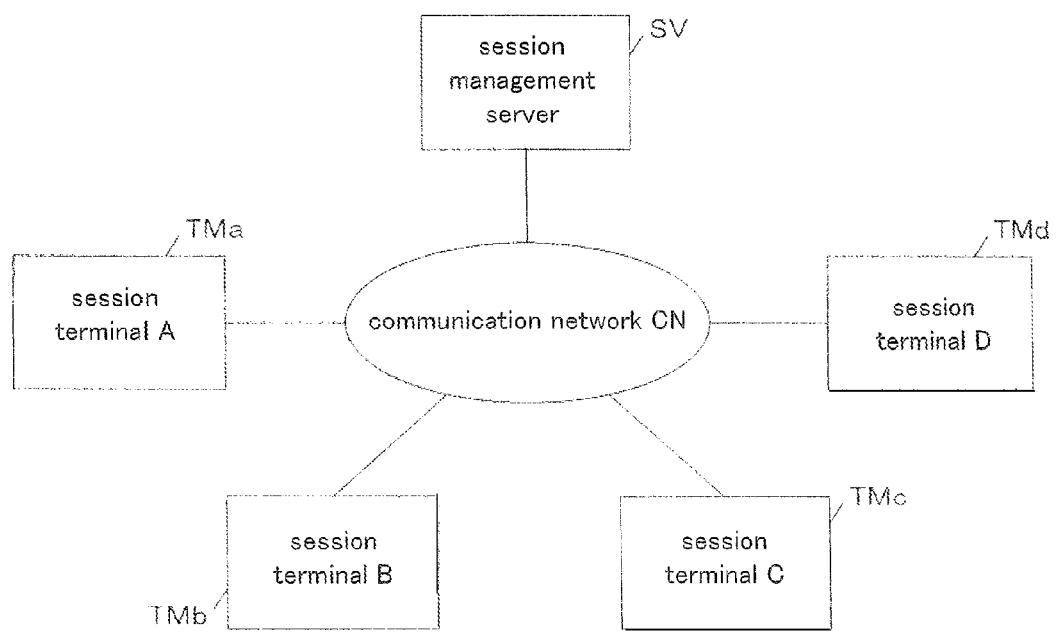
FIG. 1 indicates an example network configuration of a delay measurement system for network music session according to an embodiment of the present invention.

FIG. 1 indicates a configuration of the delay measurement system for network music session according to the embodiment of the present invention. The delay measurement system is included in a network music session system formed of a session management server SV and a plurality of session terminals TM: TMa to TMd (the letters "TM" represent a session terminal). The session management server SV and the session terminals TMa to TMd are connected to a communication network CN, respectively. The session management server SV assists connections between the member session terminals TM. For instance, the session management server SV makes arrangements for connections between the respective session terminals TM before starting a session. After the establishment of the connections between session terminals TM such as the session terminals TMa to TMd, the delay measurement is conducted between the session terminals TMa to TMd without the session management server SV, and then performance information such as audio data is transmitted and received between the session terminals TMa to TMd. Because the operation of the session management server SV is well-known, detailed operation of the session management server SV will not be explained in this description. The session terminals TMa to TMd which serve as network music session members are electronic musical apparatuses which are capable of playing a musical instrument and/or karaoke. FIG. 1 indicates four session terminals TM (session members) as an example. However, the number of session terminals TM is not limited to four (the number of session terminals TM can be larger and smaller than four).

Figure 2:
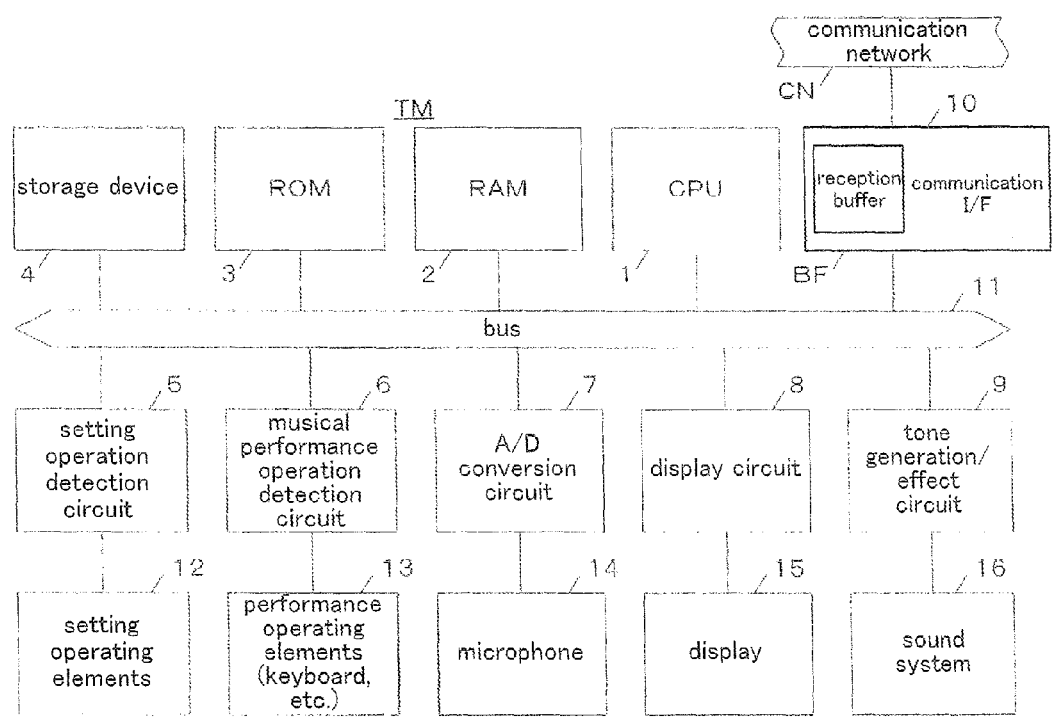
FIG. 2 indicates an example hardware configuration of respective session terminals (electronic musical instrument or PC) TM.

FIG. 2 is a block diagram indicative of an example hardware configuration of the session terminals which form the network music session system. Each session terminal TM which performs network music session is a kind of computer having a capability of electronically processing music information, and can be an electronic musical instrument or an electronic musical apparatus such as a personal computer (PC) on which a musical information processing application has been installed. The session terminal TM has a central processing unit (CPU) 1, a random-access memory (RAM) 2, a read-only memory (ROM) 3, a storage device 4, a setting operation detection circuit 5, a musical performance operation detection circuit 6, an analog-to-digital (A/D) conversion circuit 7, a display circuit 8, a tone generation/effect circuit 9, a communication interface (I/F) 10 and the like, with these components 1 to 10 being connected with each other via a bus 11.

The CPU 1 serves as a data processing portion along with the RAM 2 and the ROM 3 to carry out various kinds of information processing including delay measurement processing in accordance with control programs including a delay measurement program for network music session. The RAM 2 is used as a storage management area for retaining data necessary for the processing so that the data can be used, and a working area for temporarily storing various kinds of data. In the ROM 3, the various control programs including the delay measurement program for network music session and preset data are previously stored in order to execute the processing. The CPU 1, RAM 2 and ROM 3 are a data processing portion (computer portion) which will be described later.

The storage device 4 includes various storage media such as HD (hard disk), FD (flexible disk), CD (compact disk), DVD (digital versatile disk) and semiconductor memory such as flash memory, and their drives so that desired control programs and performance data can be stored in desired media. These storage media may be either detachable or incorporated in the session terminal TM.

The setting operation detection circuit 5 serves as a setting operating portion (panel operating portion) along with setting operating elements (panel operating elements) 12 such as switches and a mouse to detect user's operation of the setting operating elements 12 to supply setting operation information corresponding to the setting operation to the data processing portion (1 to 3), while the data processing portion makes various settings in accordance with the setting operation information. The musical performance operation detection circuit 6 serves as a musical instrument performance inputting portion along with performance operating elements 13 such as a keyboard to detect operation of the performance operating elements 13 by a terminal user to supply performance operation information corresponding to the performance operation to the data processing portion, while the data processing portion transmits performance data based on the performance operation information to the tone generation/effect circuit 9.

The A/D conversion circuit 7 serves as a vocal inputting portion along with a microphone 14 to convert vocal sound signals input through the microphone 14 by the terminal user's vocal performance to digital signals to supply the digital signals to the data processing portion, while the data processing portion transmits audio data based on the digital signals to an effect portion of the tone generation/effect circuit 9. The display circuit 8 has a display 15 such as an LCD for displaying various kinds of screens necessary for various settings and performance input such as musical instrument performance and vocal performance, and indicators/lamps (not shown) to control display and illumination of the display 15 and the indicators/lamps in accordance with instructions made by the data processing portion to provide visual guidance on the settings and performance input.

The tone generation/effect circuit 9 has a tone generating portion for generating audio data in accordance with performance data, and an effect portion including a DSP for carrying out various kinds of audio data processing. For instance, the tone generating portion generates audio data in accordance with performance data obtained from performance operation information supplied from the musical performance operation detection circuit 6 or performance data obtained from the ROM 3, the storage device 4 or the communication I/F 10, while the effect portion adds effects to audio data supplied from the microphone 14, audio data generated by the tone generating portion, or audio data obtained through the communication I/F 10 or the like and mixes the audio data to generate audio output data. A sound system 16 includes a D/A converting portion, an amplifier, speakers (including a headphone) and the like, and generates musical tones (musical tones played by musical instruments and vocals) based on the audio output data supplied from the tone generation/effect circuit 9. The effect portion of the tone generation/effect circuit 9 and the sound system 16 function as an audio output reproduction portion (DRo).

The communication I/F 10 includes one or more of a general short-distance wired I/F such as IEEE 1394, a general network I/F such as Ethernet (trademark), and a general short-distance wireless I/F such as wireless LAN and Bluetooth (trademark) to allow to exchange performance data and audio data between the other session terminals via a communication network CN such as Internet and to receive control programs and data from external apparatuses such as a server computer to store the received programs and data in the storage device 4. A receiving portion of the communication I/F 10 serves as a reception buffer BF for buffering audio data transmitted from a different session terminal and supplying the audio data to the effect portion of the tone generation/effect circuit 9, while a transmitting portion of the communication I/F 10 serves as an audio input processing portion (DRi). In a case where input audio signals are vocal sound signals, the ND conversion circuit 7 is also included in the audio input processing portion (DRi).

In a case where an electronic musical instrument is used as a session terminal TM without karaoke, a vocal input portion (the microphone 14 and the A/D conversion circuit 7) is not necessary. In a case where a PC having a music information processing application is used as a session terminal TM in order to perform only karaoke, a musical instrument performance input portion (the performance operating elements 13 and the performance operation detection circuit 6) is not necessary. Although the session management server SV has a hardware configuration which is almost similar to FIG. 2, the session management server SV does not need the musical instrument performance input portion (the performance operating elements 13 and the performance operation detection circuit 6) and a performance reproduction portion (the tone generation/effect circuit 9 and the sound system 16).

[Measurement of Audio (Sound) Input/Output Delay Time]

Figure 3:
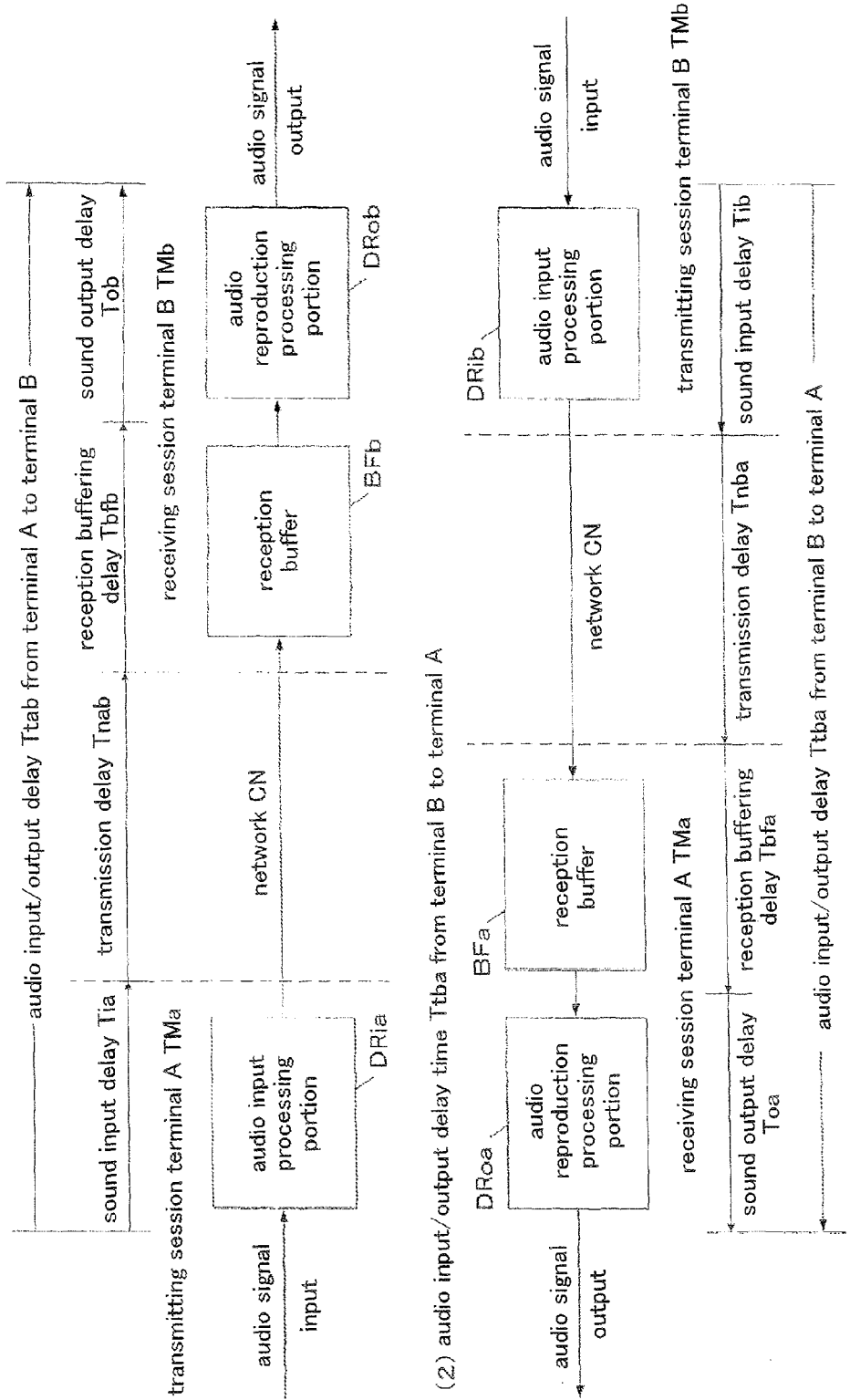
FIG. 3 illustrates audio input/output delay time measured on the delay measurement system for network music session according to the embodiment of the invention.

FIG. 3 illustrates audio (sound) input/output delay time Tt measured by the delay measurement system for network music session according to the embodiment of the present invention. The audio input/output delay time Tt between the two session terminals TM is determined in accordance with the following pieces of information (factors) (a) to (d). A reference symbol "Tt" represents audio input/output delay time (also referred to as sound input/output delay time, or simply referred to as input/output delay time or input/output delay). A reference symbol "Ti" represents audio input delay time (also referred to as sound input delay time, or simply referred to as input delay time or input delay). A reference symbol "Tn" represents transmission delay time (also simply referred to as transmission delay). A reference symbol "Tbf" represents reception buffering delay time (also simply referred to as reception buffering delay). A reference symbol "To" represents audio output delay time (also referred to as sound output delay time, or simply referred to as output delay time or output delay). Letters "ab", "ba" added to the reference symbols indicate signal transmission from the terminal TMa to the terminal TMb, and signal transmission from the terminal TMb to the terminal TMa, respectively, while the letters "a" and "b" indicate the terminal TMa and the terminal TMb, respectively.

(a) audio (sound) input delay time (also referred to as recording delay) Ti: Tia, Tib, etc.

The audio input delay time Ti represents delay time from the input of an audio signal to the audio (sound) input processing portion DRi on one session terminal TM to the start of transmission of the audio signal to the communication network CN. In a case where there are also a delay caused by A/D conversion and a delay caused by encoding, the delay time caused by the A/D conversion and the encoding is also included in the audio input delay time Ti.

(b) transmission delay time (also referred to as network delay) Tn: Tnab, Tnba, etc.

The transmission delay time Tn represents pure transmission delay time on the network connecting the two terminals in a case where one session terminal TM is connected to the other session terminal TM through the communication network CN. Because the communication environment of the communication network CN can be changed, it is necessary to monitor the transmission delay time Tn at regular intervals.

(c) reception buffering delay time Tbf: Tbfa, Tbfb, etc.

The reception buffering delay time Tbf represents delay time caused by one session terminal TM buffering an audio signal received through the communication network CN at the reception buffer BF. The buffer size of the reception buffer BF may be automatically determined. Alternatively, the buffer size may be determined by user's manipulation. In this case, because the buffer size is variable, it is necessary to monitor the reception buffering delay time Tbf at regular intervals.

(d) audio (sound) output delay time (also referred to as reproduction delay) To: Toa, Tob, etc.

The audio output delay time To represents delay time from the output of a received audio signal from the reception buffer BF to the audio reproduction processing portion DRo to actual generation of a musical tone corresponding to the audio signal. In a case where there are a delay caused by D/A conversion and a delay caused by decoding, the delay time caused by the D/A conversion and the decoding is also included in the audio output delay time.

Once all pieces of information Ti, Tn, Tbf, and To are obtained for each currently communicating session terminal TM, a delay from one session terminal MT to its partner session terminal, that is, the total input/output delay Ttab from the one terminal TMa to the partner terminal TMb taken from the input of an audio signal on the one terminal TMa to the reproduction of the audio signal on the partner terminal TMb can be measured by figuring out "sound input delay Tia on the audio input processing portion DRia of the one terminal TMa"+"transmission delay (transmission delay from the one terminal to the partner terminal) Tnab from the one terminal TMa to the partner terminal TMb"+"buffering delay Tbfb on the reception buffer BFb of the partner terminal TMb"+"sound output delay Tob on the audio reproduction processing portion DRob of the partner terminal TMb" as indicated in FIG. 3(1), for example. As indicated in FIG. 3(2), furthermore, a delay from the partner terminal to the one terminal, that is, the total input/output delay Ttba from the partner terminal TMb to the one terminal TMa taken from the input of an audio signal on the partner terminal TMb to the reproduction of the audio signal on the one terminal can be measured by figuring out "sound input delay Tib on the audio input processing portion Drib of the partner terminal TMb"+ "transmission delay Tnba from the partner terminal TMb to the one terminal TMa (transmission delay from the partner terminal to the one terminal)"+"buffering delay Tbfa on the reception buffer BFa of the one terminal TMa"+"sound output delay Toa on the audio reproduction processing portion DRoa of the one terminal TMa". In order to carry out the measurement, the following procedures (1) to (4) should be done in sequence.

(1) Prior Measurement

The input delay Ti and the output delay To are previously measured for each session terminal TM. In a case where the session terminal TM is an audio device such as a PC, the delay information Ti, To can be retrieved by making inquiries to a driver (for instance, ASIO driver on Windows (trademark), and Core Audio driver on Mac). The coding (encoding and decoding) delay can be obtained in accordance with currently used coding logic and sampling rate.

(2) Data Communication (Exchange) Upon Establishment of Connection

When the connection has been established between the session terminals TM, the session terminals TM transmit/receive (exchange) their output delays To and input delays Ti over the network CN, respectively. The exchange can be done by any scheme such as:

Adding information at the time of negotiation on call control protocol such as SIP (Session Initiation Protocol)

Adding information to control protocol such as RTCP (RTP Control Protocol)

(3) Periodic Packet Transmission/Reception

Then, packets for network (transmission) delay measurement are transmitted periodically between the session terminals TM to measure RTT by use of the following scheme to calculate RTT/2 to figure out the network (transmission) delay Tn. As indicated in FIG. 3, in a case where the session terminal A and the session terminal B are connected to each other, for example, RTT (round trip delay between the terminal TMa and the partner terminal TMb)/2 can be approximated as RTT/2=Tn=Tnab(transmission delay from the terminal A to the partner terminal B)=Tnba (transmission delay from the partner terminal B to the terminal A).

[1] To a periodic packet which the terminal A transmits for the first time, a time stamp indicative of time t1 at which the packet is transmitted is added in accordance with a clock of the terminal A.

[2] The terminal B receives the periodic packet sent from the terminal A, determines time t2 at which the terminal B received the packet in accordance with a clock of the terminal B, and records the determined reception time t2 along with the transmission time t1 recorded in the packet.

[3] Next, the terminal B transmits a periodic packet. More specifically, the terminal B determines time t3 at which this packet is transmitted in accordance with the clock of the terminal B, and adds (time-stamps) the transmission time t1 and reception time t2 of the most recently (most previously) received periodic packet, and the packet transmission time t3 to the packet which the terminal B transmits.

[4] When the terminal A receives the periodic packet sent from the terminal B, the terminal A determines time t4 at which the terminal A received the packet in accordance with the clock of the terminal A, measures RTT [equation (1)] on the basis of the determined reception time t4, and the most previous packet's transmission time t1 and reception time t2 and the received packet's transmission time t3 which have been added to the received packet, and then estimates a one-way network delay, that is, the transmission delay Tn [equation (2)]:

$$RTT=(t4-t1)-(t3-t2) \quad (1)$$

$$\text{transmission delay } Tn=RTT/2 \quad (2)$$

Although the transmission of periodic packets can be done by any scheme, there is a scheme in which information is added to a control protocol such as the above-described RTCP (RTP Control Protocol). To a periodic packet which is to be transmitted, furthermore, the reception buffering delay Tbf of the terminal from which the packet is transmitted is also attached to notify the partner terminal to which the packet is to be sent. Because the buffer size of the reception buffer BF can be changed by user's manipulation or by automatic adjustment, the reception buffering delay Tbf should be updated by periodical packet exchange.

(4) Calculation of Input/Output Delay Tt

Assuming that the one terminal is terminal A, and the partner terminal is terminal B, "delay Ttab from the terminal A to the partner terminal B" can be figured out by calculating an equation "input delay Tia of the terminal A" (obtained by prior measurement)+"transmission delay Tn" (obtained by a periodic packet)+"reception buffering delay Tbfb of the partner terminal B" (obtained by reception of periodic packet)+"output delay Tob of the partner terminal B" (obtained by data exchange at the time of establishment of connection).

Furthermore, "delay Tba from the partner terminal B to the terminal A" can be figured out by calculating an equation "input delay Tib of the partner terminal B" (obtained by data exchange at the time of establishment of connection)+"transmission delay Tn" (obtained by a periodic packet)+"reception buffering delay of the terminal A" (calculated on the basis of buffer size)+"output delay of the terminal A" (obtained by prior measurement).

The above-described procedures (1) to (4) have the following characteristics:

(1) Respective terminals TM previously transmit/receive (exchange) their input delays Ti and output delays To between the terminals TM.

(2) The variable transmission delay Tn can be updated by exchanging packets for measurement at regular intervals between the terminals TM, while the transmission delay Tn can be easily obtained on the basis of RTT without the need for high-precision clock synchronization between the terminals TM (errors caused by transmission directions can be ignored).

(3) By including reception buffer size which is variable in periodically exchanged packets, the terminals TM can exchange the latest values of the reception buffer size between the terminals TM.

As explained above, in the delay measurement system for network music session according to the embodiment of the present invention, the terminal A obtains its own input delay time Tia indicative of delay time from input of an audio signal to start of transmission of the audio signal, transmission delay time Tn from the terminal A to the partner terminal B indicative of delay time from start of transmission of the audio signal to reception of the audio signal by the partner terminal B, partner terminal reception buffering delay time Tbfb indicative of delay time from reception of the audio signal by the reception buffer portion BFb of the partner terminal B to output of the audio signal by the partner terminal B, and partner terminal output delay time Tob indicative of delay time from input of the audio signal from the reception buffer portion BFb to output of the audio signal by the audio reproduction portion DRob of the partner terminal B to sum up these delay times Tia, In, Tbfb, and Tob to determine input/output delay time Ttab indicative of delay time from input of the audio signal on the terminal A to output of the audio signal from the audio reproduction portion DRob of the partner terminal B.

[Action Example]

Figure 4:
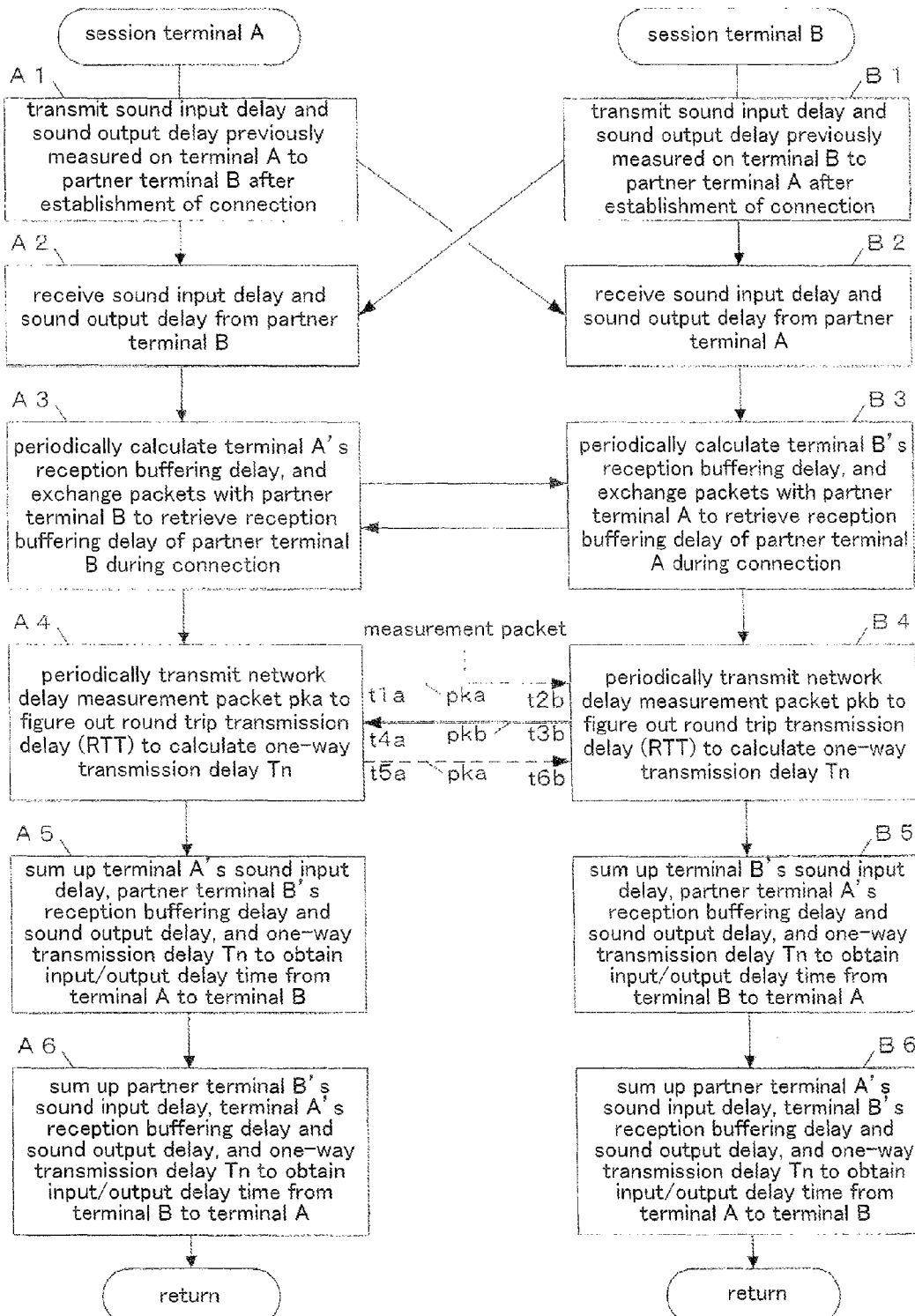
FIG. 4 indicates the first half of an action example of the delay measurement system for network music session according to the embodiment of the invention.

FIG. 4 indicates an action flow example of the delay measurement system for network music session according to the embodiment of the present invention. In other words, FIG. 4 indicates a flowchart indicative of a program executed by the data processing portion (computer portion) formed of the CPU 1, RAM 2 and ROM 3. In this example in which the action flow shows a case where the session terminal A and the session terminal B are connected with each other to perform a network music session, the terminals A and B operate similarly to perform symmetrical actions. In the following explanation, therefore, step numbers and reference symbols (letters "a" and "b" are added) for similar actions between the terminals A and B will be written side by side. Therefore, the step numbers and reference symbols will be provided side by side throughout the explanation to correspond to each other in the order they appear.

First, the terminals A, B previously measure their own sound input delays Tia, Tib and sound output delays Toa, Tob, respectively. When user's instruction to start measuring on the terminals A, B is made after the establishment of connection between the terminals A, B, the terminals A, B proceed to steps A1, B1, respectively, to transmit their own sound input delays Tia, Tib, and sound output delays Toa, Tob which have already been measured to each other. As a result, the terminals A, B can receive and obtain both the sound input delays Tib, Tia and the sound output delays Tob, Toa of their respective partner terminals B, A at the next steps A2, B2 to further proceed to steps A3 to A4, B3 to B4, respectively.

At steps A3, B3, the terminals A, B calculate their own reception buffering delays Tbfa, Tbfb, respectively, at regular intervals during the connection between the terminals A, B, and transmit packets to which the calculated reception buffering delays Tbfa, Tbfb are attached, respectively, to each other to receive and obtain the reception buffering delays Tbfb, Tbfa of their partner terminals B, A, respectively. In other words, because the reception buffering delays Tbfa, Tbfb of the reception buffers BF of the terminals A, B are automatically controlled according to the traffic of the network CN by their systems during the connection between the terminals A, B, or users of the systems may change the reception buffering delays Tbfa, Tbfb, the reception buffering delays Tbfa, Tbfb are updated at regular intervals.

At steps A4, B4, by periodically issuing (transmitting) packets pka, pkb for network (transmission) delay measurement, the terminals A, B measure the network (transmission) delay Tn to update the transmission delay Tn at regular intervals. As indicated in the figure, for example, when the terminal A transmits the measurement packet pka, the terminal A records (time-stamps) time t1a at which the packet is to be transmitted on the packet pka, while the terminal B records time t2b indicative of the reception time in response to reception of the packet pka. When the terminal B then transmits a periodic packet pkb, the terminal B records (time-stamps) time t1a indicative of the time of transmission of the packet pka most recently received from the terminal A, the time t2b indicative of the time of reception of the packet pka, and time t3b indicative of the time of transmission of the packet pkb on the packet pkb. When the terminal A receives the packet pkb, the terminal A calculates the transmission delay Tn in accordance with an equation (3) on the basis of the time t1a indicative of the time of transmission by the terminal A, the time t2b indicative of the time of reception by the partner terminal B, the time t3b indicative of the time of transmission by the partner terminal B recorded on the packet pkb, and time t4a indicative of the time of reception of the packet pkb. Values indicated by the times T1a, T4a are values counted by the clock of the terminal A, as indicated by the added letter "a". Values indicated by the times T2b, T3b are values counted by the clock of the terminal B, as indicated by the added letter "b".

$$Tn=[(T4a-T1a)-(T3b-T2b)]/2 \quad (3)$$

On the terminal B as well, the transmission delay Tn can be calculated similarly to the terminal A. In this case, when the terminal A transmits a periodic packet pka after receiving the packet pkb at the time t4a, as indicated by broken lines in the figure, the terminal A records (time-stamps) the transmission time t3b at which the most recently received packet pkb was sent by the terminal B, the reception time t4a at which the terminal A received the packet pkb, and time t5a at which the terminal A is to send the packet pka on the packet pka. When the terminal B receives the packet pka (broken lines), the terminal B calculates the transmission delay Tn according to an equation (4) on the basis of the time t3b indicative of the time of transmission by the terminal B, the time t4a indicative of the time of reception by the partner terminal A, and the time t5a indicative of the time of transmission by the partner terminal A recorded on the packet pka, and time t6b indicative of the time of reception of the packet pka (broken lines).

$$Tn=[(T6b-T3b)-(T5a-T4a)]/2 \quad (4)$$

The retrieval of the delay information Tbf, Tn based on the periodic transmissions of packets on the steps A3 to A4, B3 to B4 is continuously repeated during the connection between the terminals A and B. In the above explanation, separate packets were used to separate the transmission and retrieval of the reception buffering delay Tbf from the transmission of the time stamps and the retrieval of the transmission delay Tn. However, the transmission of the reception buffering delay Tbf and time stamps may be done by a single packet.

After the steps A3 to A4, B3 to B4, the process proceeds to steps A5 to A6, B5 to B6. At steps A5, 85, the terminals A, B sum up their own sound input delays Tia, Tib, their respective partner's reception buffering delays Tbfb, Tbfa and the sound output delays Tob, Toa, and the one-way transmission delay In, respectively, to figure out the input/output delay times Ttab, Ttba between the terminals A and B, B and A, respectively. At steps A6, B6, furthermore, their respective partner's sound input delays Tib, Tia, their own reception buffering delays Tbfa, Tbfb and sound output delays Toa, Tob, and the one-way transmission delay Tn are summed up to figure out the input/output delay times Ttba, Ttab between the terminals B and A, A and B. After the steps A6, B6, the process returns to steps A3, B3 to repeat the steps A3 to A6, B3 to B6, respectively (not shown), to return to the original state in response to user's instruction to terminate the measurement.

As for the steps AS and A6 carried out by the terminal A, and the steps B5 and B6 carried out by the terminal B, the process may be modified such that at least one of the steps is to be carried out (for example, only step A5 or step A6 on the terminal A, while only step B5 or step B6 on the terminal B).

What is claimed is:

1. A delay measurement apparatus for network music session, the delay measurement apparatus for a session terminal STx configured for performing a network music session with a partner session terminal STp when connected with the session terminal STx through a communication network so that the session terminal STx is to communicate with the partner session terminal STp, the delay measurement apparatus comprising:

one or more memories, which includes one memory storing a program;
   a processor, together with the one or more memories, configured when executing the program, configured for:
      retrieving a terminal's input delay time, which represents a delay time from an inputting of an audio signal to a start of a transmission of the audio signal on the session terminal STx;
      retrieving a transmission delay time from the session terminal STx to the partner session terminal STp, the transmission delay time representing a delay time from the start of the transmission of the audio signal by the session terminal STx to a reception of the audio signal by the partner session terminal STp;
      retrieving a partner's reception buffering delay time, which represents a delay time from the reception of the audio signal by a reception buffer of the partner session terminal STp to an inputting of the audio signal to audio reproduction hardware of the partner session terminal STp;
      retrieving a partner's output delay time, which represents a delay time from an outputting of the audio signal from the reception buffer to an outputting of the audio signal by the audio reproduction hardware on the partner session terminal STp; and
      summing up the retrieved terminal's input delay time, the retrieved transmission delay time from the session terminal STx to the partner session terminal STp, the retrieved partner's reception buffering delay time, and the retrieved partner's output delay time, and determining an input/output delay time from the inputting of the audio signal on the session terminal STx to the outputting of the audio signal from the audio reproduction hardware of the partner session terminal STp.

2. The delay measurement apparatus for network music session according to claim 1, the processor, together with the one or more memories, configured for:
   updating the transmission delay time from the session terminal STx to the partner session terminal STp by using first measurement packets and second measurement packets, which are respectively transmitted to and received from, at regular intervals, the partner session terminal STp to monitor times at which the first and second measurement packets are respectively transmitted and received.

3. The delay measurement apparatus for network music session according to claim 1, the processor, together with the one or more memories, configured for:
   receiving a buffer size of the reception buffer of the partner session terminal STp, wherein the buffer size is variable for changing automatically or in accordance with user's manipulation; and
   updating the partner's reception buffering delay time, at regular intervals, in accordance with the received buffer size of the partner session terminal STp.

4. The delay measurement apparatus for network music session according to claim 1, wherein
   the delay time represented by the terminal's input delay time includes a delay time caused by A/D conversion and encoding of the input audio signal by transmission circuitry of a communication interface.

5. The delay measurement apparatus for network music session according to claim 1, wherein
   the delay time represented by the partner's output delay time includes a delay time caused by decoding and D/A conversion of the input audio signal by the audio reproduction hardware of the partner session terminal STp; and the processor, together with the one or more memories, configured for retrieving the partner's output delay time from the partner session terminal STp in response to establishment of connection with the partner session terminal STp.

6. A delay measurement method for network music session, the method for execution on a session terminal STx configured for performing a network music session with a partner session terminal STp when connected with the session terminal STx through a communication network so that the session terminal STx is to communicate with the partner session terminal STp, the method comprising:

retrieving a terminal's input delay time, which represents a delay time from an inputting of an audio signal to a start of a transmission of the audio signal on the session terminal STx;

retrieving a transmission delay time from the session terminal STx to the partner session terminal STp, the transmission delay time representing a delay time from the start of the transmission of the audio signal by the session terminal STx to a reception of the audio signal by the partner session terminal STp;

retrieving a partner's reception buffering delay time, which represents a delay time from the reception of the audio signal by the reception buffer of the partner session terminal STp to an inputting of the audio signal to audio reproduction hardware of the partner session terminal STp;

retrieving a partner's output delay time, which represents a delay time from an outputting of the audio signal from the reception buffer to an outputting of the audio signal by the audio reproduction hardware on the partner session terminal STp; and summing up the retrieved terminal's input delay time the retrieved transmission delay time from the session terminal STx to the partner session terminal STp, the retrieved partner's reception buffering delay time, and the retrieved partner's output delay time, and determining an input/output delay time from the inputting of the audio signal on the session terminal STx to the outputting of the audio signal from the audio reproduction hardware of the partner session terminal STp.

7. The delay measurement method for network music session according to claim 6, the method comprising:

updating the transmission delay time from the session terminal STx to the partner session terminal STp by using first measurement packets and second measurement packets, which are respectively transmitted to and received from, at regular intervals, the partner session terminal STp to monitor times at which the first and second measurement packets are respectively transmitted and received.

8. The delay measurement method for network music session according to claim 6, the method comprising:

receiving a buffer size of the reception buffer of the partner session terminal STp, wherein the buffer size is variable for changing automatically or in accordance with user's manipulation; and updating the partner's reception buffering delay time, at regular intervals, in accordance with the received buffer size of the partner session terminal STp.

9. The delay measurement method for network music session according to claim 6, wherein the delay time represented by the terminal's input delay time includes a delay time caused by A/D conversion and encoding of the input audio signal by transmission circuitry of a communication interface.

10. The delay measurement method for network music session according to claim 6, wherein the delay time represented by the partner's output delay time includes a delay time caused by decoding and D/A conversion of the input audio signal by the audio reproduction hardware of the partner session terminal STp; and the method comprising retrieving the partner's output delay time from the partner session terminal STp in response to establishment of connection with the partner session terminal STp.

11. A non-transitory computer-readable medium storing a delay measurement computer program for network music session, the computer program for execution on a session terminal STx configured for performing a network music session with a partner session terminal STp when connected with the session terminal STx through a communication network so that the session terminal STx is to communicate with the partner session terminal STp, the computer program, when executed by the computer, causing the computer to perform:

retrieving a terminal's input delay time, which represents a delay time from an inputting of an audio signal to a start of a transmission of the audio signal on the session terminal STx;

retrieving a transmission delay time from the session terminal STx to the partner session terminal STp, the transmission delay time representing a delay time from the start of the transmission of the audio signal by the session terminal STx to a reception of the audio signal by the partner session terminal STp;

retrieving a partner's reception buffering delay time, which represents a delay time from the reception of the audio signal by the reception buffer of the partner session terminal STp to an inputting of the audio signal to audio reproduction hardware of the partner session terminal STp;

retrieving a partner's output delay time, which represents a delay time from an outputting of the audio signal from the reception buffer to an outputting of the audio signal by the audio reproduction hardware on the partner session terminal STp; and summing up the retrieved terminal's input delay time the retrieved transmission delay time from the session terminal STx to the partner session terminal STp, the retrieved partner's reception buffering delay time, and the retrieved partner's output delay time, and determining an input/output delay time from the inputting of the audio signal on the session terminal STx to the outputting of the audio signal from the audio reproduction hardware of the partner session terminal STp.

* * * * *